US008037059B2

(12) United States Patent
Bestgen et al.

(10) Patent No.: US 8,037,059 B2
(45) Date of Patent: Oct. 11, 2011

(54) IMPLEMENTING AGGREGATION COMBINATION USING AGGREGATE DEPTH LISTS AND CUBE AGGREGATION CONVERSION TO ROLLUP AGGREGATION FOR OPTIMIZING QUERY PROCESSING

(75) Inventors: Robert J. Bestgen, Rochester, MN (US); David G. Carlson, Rochester, MN (US); Robert V. Downer, Rochester, MN (US); Shantan Kethireddy, Rolling Meadows, IL (US)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 12/113,259

(22) Filed: May 1, 2008

(65) Prior Publication Data

US 2009/0276393 A1     Nov. 5, 2009

(51) Int. Cl.
     *G06F 17/30*      (2006.01)
(52) U.S. Cl. .......... 707/718; 707/999.001; 707/999.003; 707/999.005
(58) Field of Classification Search ........................ None
See application file for complete search history.

(56) References Cited

U.S. PATENT DOCUMENTS

| 5,963,936 | A * | 10/1999 | Cochrane et al. ............ 1/1 |
| 6,173,281 | B1 | 1/2001 | Bestgen et al. |
| 6,260,037 | B1 | 7/2001 | Bestgen et al. |
| 6,763,352 | B2 * | 7/2004 | Cochrane et al. ............ 1/1 |
| 6,775,682 | B1 * | 8/2004 | Ballamkonda et al. ............ 1/1 |
| 7,035,843 | B1 * | 4/2006 | Bellamkonda et al. ............ 1/1 |
| 2003/0208506 | A1 * | 11/2003 | Greenfield et al. ........... 707/102 |
| 2005/0027690 | A1 * | 2/2005 | Zhang et al. ............ 707/3 |
| 2006/0294129 | A1 * | 12/2006 | Stanfill et al. ............ 707/102 |

OTHER PUBLICATIONS

J.X. Yu and H. Lu. "Multi-cube computation." 2001, IEEE, In Proc. 7th International Symposium on Database Systems for Advanced Applications, Hong Kong, Apr. 18-21, 2001. pp. 126-133.*
Wang et al., "Efficient OLAP Operations in Spatial Data Using Peano Trees," Jun. 2003, ACM, DMKD'03 pp. 28-34.*
Morfonios et al., "CURE for cubes: cubing using a ROLAP engine," Proceedings of the 32nd international conference on Very large data bases, Sep. 12-15, 2006, ACM, VLDB'06, pp. 379-390.*
Sismanis et al., "Hierarchical Dwarfs for the Rollup Cube," 2003, ACM, Data Warehousing and OLAP—Proceedings of the 6th ACM international workshop on Data warehousing and OLAP, pp. 17-24.*

* cited by examiner

*Primary Examiner* — Charles Kim
*Assistant Examiner* — Richard Bowen
(74) *Attorney, Agent, or Firm* — Joan Pennington

(57) ABSTRACT

A process combines multiple grouping sets into single rollup sets with depth lists defining the levels of grouping that must be performed. Grouping sets are identified that are contained within other sets and combined into single rollups with depth lists. Cube aggregation conversion to rollup aggregation is provided for optimizing database query processing. Natural sets of rollup hierarchies within a cube are recognized and the cube is converted into those rollup hierarchies. Once converted, the rollup aggregation is performed to significantly reduce required processing.

15 Claims, 6 Drawing Sheets

IMPLEMENTING AGGREGATION COMBINATION USING AGGREGATE DEPTH LISTS AND CUBE AGGREGATION CONVERSION TO ROLLUP AGGREGATION FOR OPTIMIZING QUERY PROCESSING

FIELD OF THE INVENTION

The present invention relates generally to the data processing field, and more particularly, relates to a method, apparatus and computer program product for implementing aggregation combination using aggregate depth lists and cube aggregation conversion to rollup aggregation for optimizing database query processing.

DESCRIPTION OF THE RELATED ART

Databases are used to store information for an innumerable number of applications, including various commercial, industrial, technical, scientific and educational applications. As the reliance on information increases, both the volume of information stored in most databases, as well as the number of users wishing to access that information, likewise increases. As the volume of information in a database, and the number of users wishing to access the database, increases, the amount of computing resources required to manage such a database increases as well.

Database management systems (DBMSs), which are the computer programs that are used to access the information stored in databases, often require tremendous resources to handle the heavy workloads placed on such systems. As such, significant resources have been devoted to increasing the performance of database management systems with respect to processing searches, or queries, to databases.

The use of relational databases, which organize information into formally-defined tables consisting of rows and columns, and which are typically accessed using a standardized language such as Structured Query Language (SQL), has substantially improved processing efficiency, as well as substantially simplified the creation, organization, and extension of information within a database. Significant development efforts have been directed toward query optimization, so that the execution of particular searches or queries is optimized in an automated manner to minimize the amount of resources required to execute each query. Also, a reduced reliance on runtime interpretation of queries in favor of increased usage of directly-executable program code has improved query engine performance.

U.S. Pat. No. 6,260,037 issued Jul. 10, 2001 to Robert Joseph Bestgen et al., and assigned to the present assignee, discloses a method and computer program product for implementing skip key processing for database grouping queries involving aggregate operations using one or more indices in a computer system. First checking for a selected entry in a current group in a primary file is performed. Responsive to finding the selected entry in the current group, the set of records of the current group is ordered to provide an aggregate value in an aggregate field of the current group. Then checking for an excluded value in the aggregate field of the current group is performed. Responsive to not finding the excluded value in the aggregate field, a current entry is saved as a result for the group. Then checking for more groups in the primary file is performed. Responsive to finding more groups in the primary file, a unique key or prefix to the query index is obtained to position to a next group. When the selected entry in the next group is not found, then checking for more groups in the primary file is performed.

U.S. Pat. No. 6,173,281 issued Jan. 9, 2001 to Robert Joseph Bestgen et al., and assigned to the present assignee, discloses a method and computer program product for processing and combining data sets including bitmaps in a computer system. A plurality of initial data subsets to be combined are processed and data structure statistics containing predefined data attributes are built for each of the plurality of initial subsets. Checking for a dynamic selection attribute for each of the plurality of initial subsets is performed. Responsive to the dynamic selection attribute not being identified, the intermediate storage requirements for producing the combined final data set is selectively optimized. Responsive to identifying the dynamic selection attribute, both intermediate result regeneration and intermediate storage requirements for producing a combined final data set are selectively optimized.

Most business intelligence (BI) applications involve a hierarchical, multi-dimensional aggregate view of the data. The simplest form of this is the current "group by" support which aggregates data along one dimension: for example, country, region, store, product, and in the following example:
select country, region, store, product, count(*) from Table group by country, region, store, product Users naturally analyze the result set in multiple ways such as further aggregation on the country and region (group by country, region) or aggregation on the overall total (no group by clause, whole file aggregation). In addition, the user may like to aggregate from a different perspective, for example, (group by region, product). Normally, all these disparate pairings require different succinct queries. However, grouping sets and super groups SQL syntax was created for just this reason; grouping sets and super groups allow a user to aggregate in multiple ways in one query:
select country, region, store, product, count(*) from Table group by groupingSets((rollup(country, region, store)), (country, region, store, product), (country)).

For example, the present inventors have provided the support allowing a product of International Business Machines Corporation, DB2 for i5/OS, to perform multiple sets of aggregations from a single pass through the data in a table or a child sub-tree. For example, the following query can perform all three groupings (country, region), (country), and (grandtotal) using a single multiAggregate AccessPlan.
select country, region, count(*) from Table group by rollup (country, region)
This accessPlan can use a single Sorted Temporary Result or Index to perform all 3 aggregations, essentially reusing the result sets from each higher order grouping.

A need exists for an improved mechanism for optimizing database query processing.

SUMMARY OF THE INVENTION

Principal aspects of the present invention are to provide a method, apparatus and computer program product for implementing aggregation combination using aggregate depth lists and cube aggregation conversion to rollup aggregation for optimizing database query processing. Other important aspects of the present invention are to provide such method, apparatus and computer program product for optimizing database query processing substantially without negative effect and that overcome many of the disadvantages of prior art arrangements.

In brief, a method, apparatus and computer program product are provided for implementing aggregation combination using aggregate depth lists for optimizing database query processing. A process of the invention includes combining multiple grouping sets into single rollup sets with depth lists defining the levels of grouping that must be performed.

In accordance with features of the invention, grouping sets are identified that are contained within other sets and combined into single rollups with depth lists. The depth lists define what stages of grouping must be performed. The rollup depth lists are supplied as inputs in the creation of a multi-Aggregate AccessPlan. The element counts of each rollup depth list tell the execution engine how many times to perform each level of aggregation. The same sorted temporary result or index is used to perform multi-stage aggregations.

In accordance with features of the invention, a method, apparatus and computer program product are provided for implementing cube aggregation conversion to rollup aggregation for optimizing database query processing. Natural sets of rollup hierarchies within a cube are recognized and the cube is converted into those rollup hierarchies. Once converted, the rollup aggregation is performed to significantly reduce required processing.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
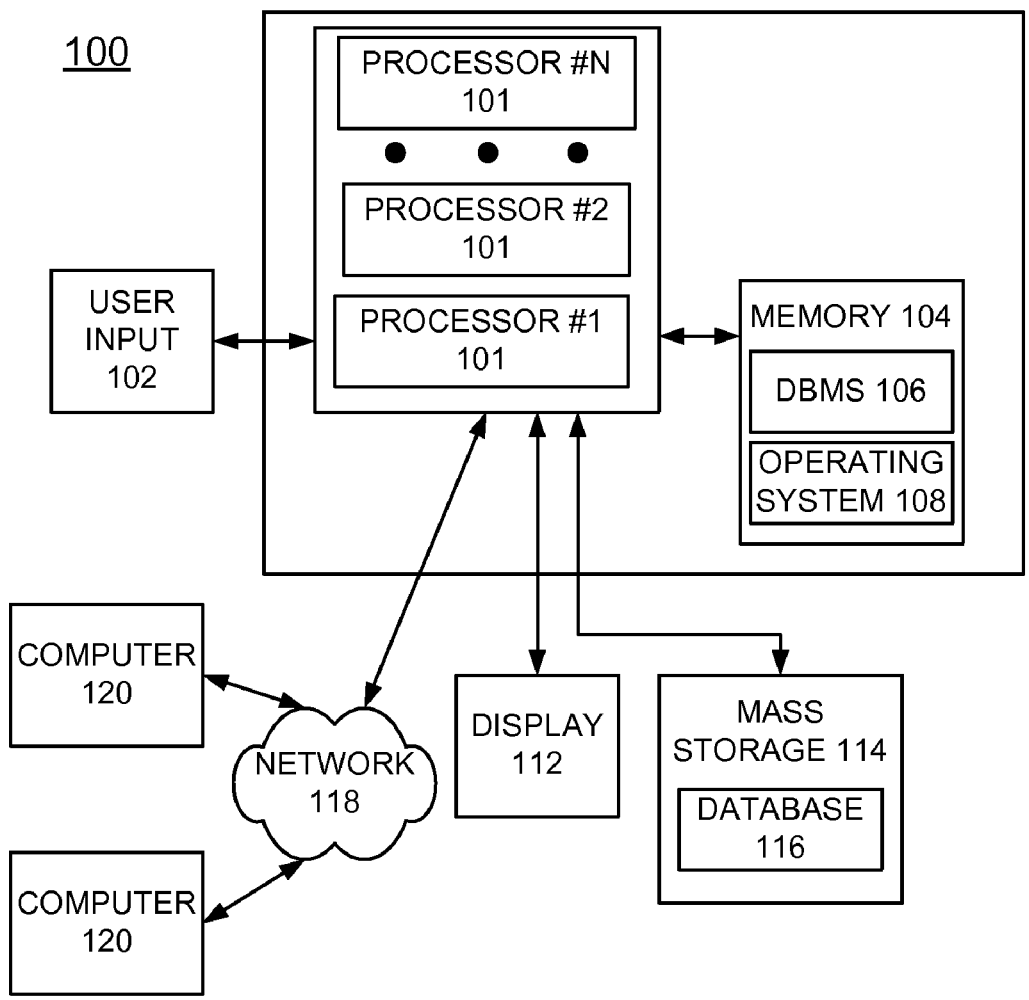
FIG. 1 is a block diagram illustrating a networked computer system for implementing methods for optimizing database query processing in accordance with the preferred embodiment.

Having reference now to the drawings, in FIG. 1, there is shown an exemplary networked computer system generally designated by the reference character 100 for implementing methods for optimizing database query processing in accordance with the preferred embodiment. Computer system 100 implements aggregation combination using aggregate depth lists and cube aggregation conversion to rollup aggregation for optimizing database query processing in accordance with the preferred embodiment.

Computer system 100 is, for example, a Symmetric Multiprocessing (SMP) system including a plurality of identical processors 101 coupled to a system bus. The multiple processors 101 are coupled to a user input 102 and a memory 104. Computer system includes a database management system (DBMS) 106 and an operating system 108 stored in memory 104.

Computer system 100 includes a display 112 and a mass storage 114, such as a direct access storage device (DASD), storing a database 116, or alternatively the database 116 is stored on another computer coupled to the computer system 100 via a network 118, such as a client computer 120.

Figure 2:
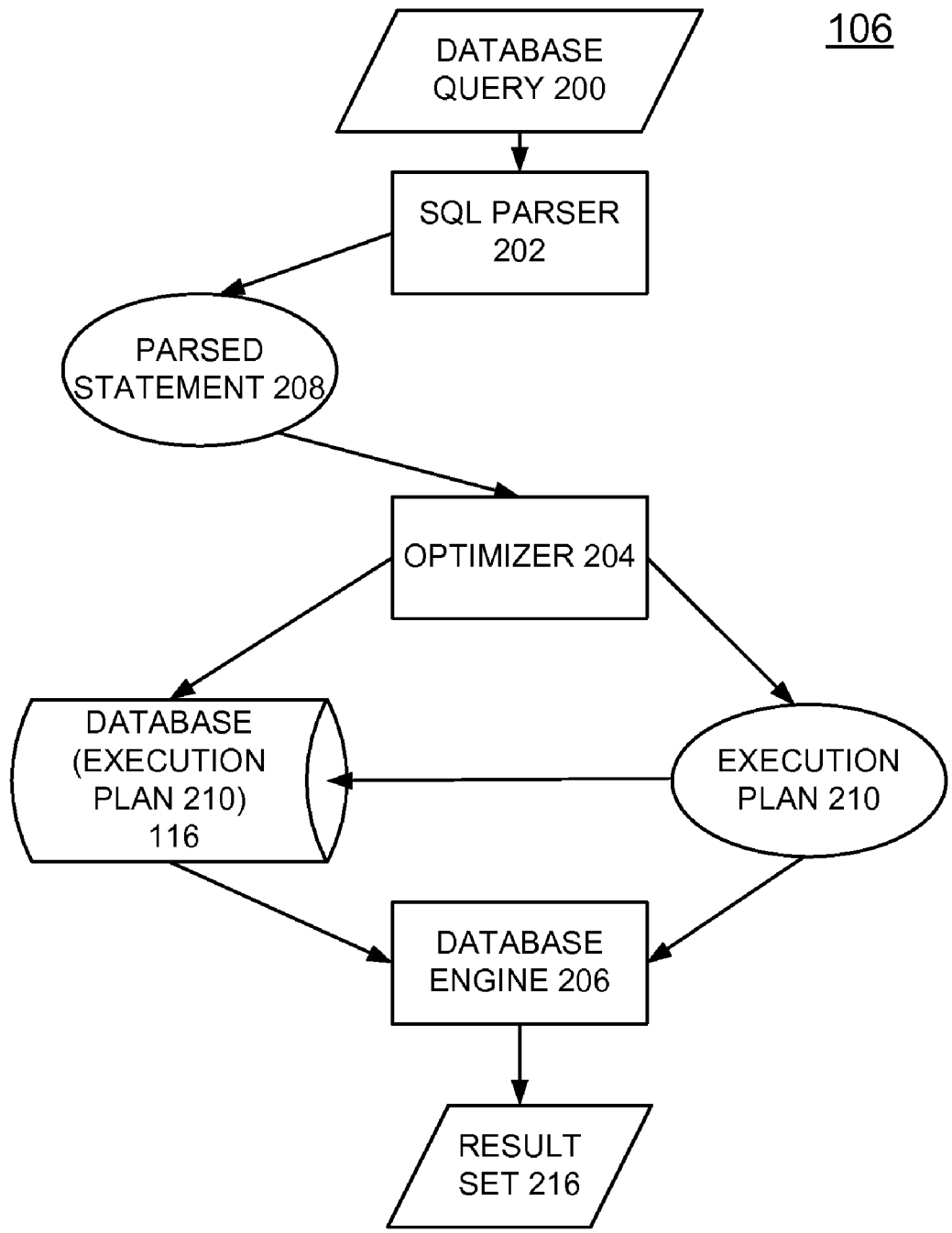
FIG. 2 is a block diagram illustrating the principal components of the database management system in the networked computer system of FIG. 1 and the flow of information between these components for implementing methods for optimizing database query processing in accordance with the preferred embodiment.

Referring also to FIG. 2, an exemplary implementation of the database management system (DBMS) 106 is shown. The principal components of the database management system (DBMS) 106 include an SQL parser 202, a query optimizer 204 of the preferred embodiment, and a database engine 206. SQL parser 202 receives from a user a database query 200, which is provided in the form of an SQL statement. SQL parser 202 generates a parsed statement 208, which is passed to the optimizer 204 for query optimization. As a result of query optimization, an execution or access plan 210 is generated, often using data such as platform capabilities, query content information, and the like, and the execution plan is stored in the database 116, which is stored in the mass storage 114. The execution plan is forwarded to the database engine 206 for execution of the data base query on the information in the database 116. The result of the execution of the data base query is typically stored in a result set, as represented by a block 216.

Other components may be incorporated into the database management system (DBMS) 106, which can include other suitable database management architectures. Other database programming and organizational architectures may also be used consistent with the invention. It should be understood that the present invention is not limited to the illustrated database management system (DBMS) 106.

Computer system 100 is shown in simplified form sufficient for an understanding of the present invention. It should be understood that the present invention is not limited for use with the illustrated computer system 100. The illustrated processor system 100 is not intended to imply architectural or functional limitations. The present invention can be used with various hardware implementations and systems and various other internal hardware devices.

Various commercially available processor systems could be used for computer system 100, for example, a selected server computer system manufactured and sold by International Business Machines Corporation.

Those skilled in the art will recognize that the exemplary environment illustrated in FIGS. 1 and 2 is not intended to limit the present invention. Those skilled in the art will recognize that other alternative hardware and software environments can be used without departing from the scope of the present invention.

In accordance with features of the preferred embodiment, a method of the invention provides a new grouping set combination algorithm or process. In this algorithm or process, the optimizer has the ability to sniff out grouping sets that are contained within other sets and combine them into single rollups with depth lists. The depth lists define what stages of grouping must be performed.

In accordance with the invention, the optimizer looks at each disparate grouping set and sniff out other grouping sets which can be combined because all of the smaller sets' n values are contained in the first n bits of the larger set (in the same order). For instance:

Note that rollup (RU) depth always includes one extra entry for whole file aggregation GroupingSet+GroupingSet combination.

$$GS(ABCD)+GS(ABCDEFG)=RU(ABCDEFG)\text{depth}\\(00001001)$$

Rollup+GroupingSet combination $$RU(ABCD)+GS(ABCDEFG)=RU(ABCDEFG)\text{depth}\\(11111001)$$

Rollup with holes+Rollup with holes combination

RU(*ABCD*)depth(11001)+RU(*ABCDEFG*)depth
(11111001)=RU(*ABCDEFG*)depth(22112001)

The rollup depth lists are then supplied as inputs in the creation of the multiAggregate AccessPlan. The counts tell the execution engine how many times to perform each level of aggregation. Thus, the same sorted temporary result or index can be used to perform multi-stage aggregations.

Figure 3:
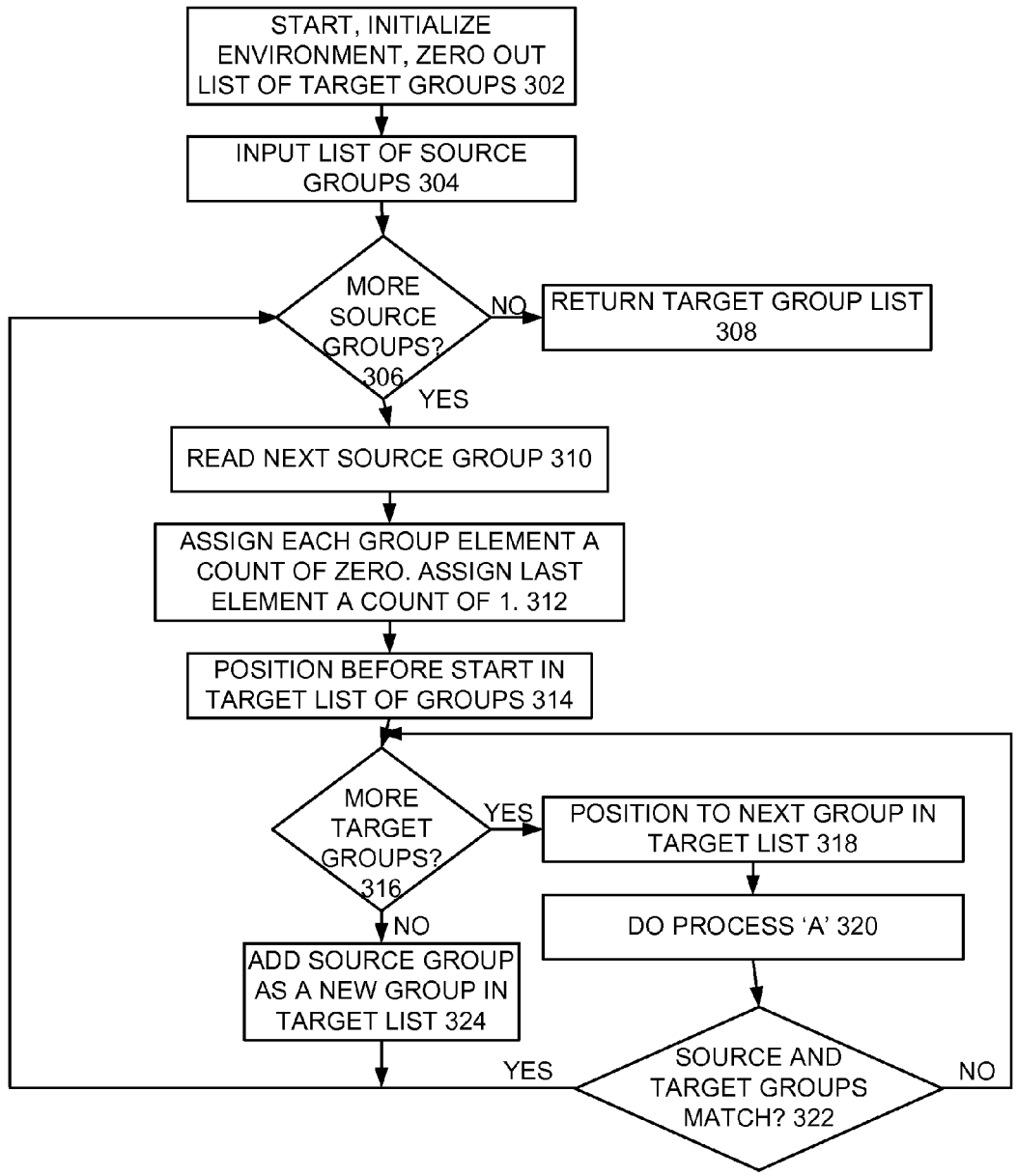
FIGS. 3, 4, 5 are flow charts illustrating exemplary steps performed by the computer system of FIG. 1 for implementing methods for implementing aggregation combination using aggregate depth lists and cube aggregation conversion to rollup aggregation for optimizing database query processing in accordance with the preferred embodiment.
Figure 4:
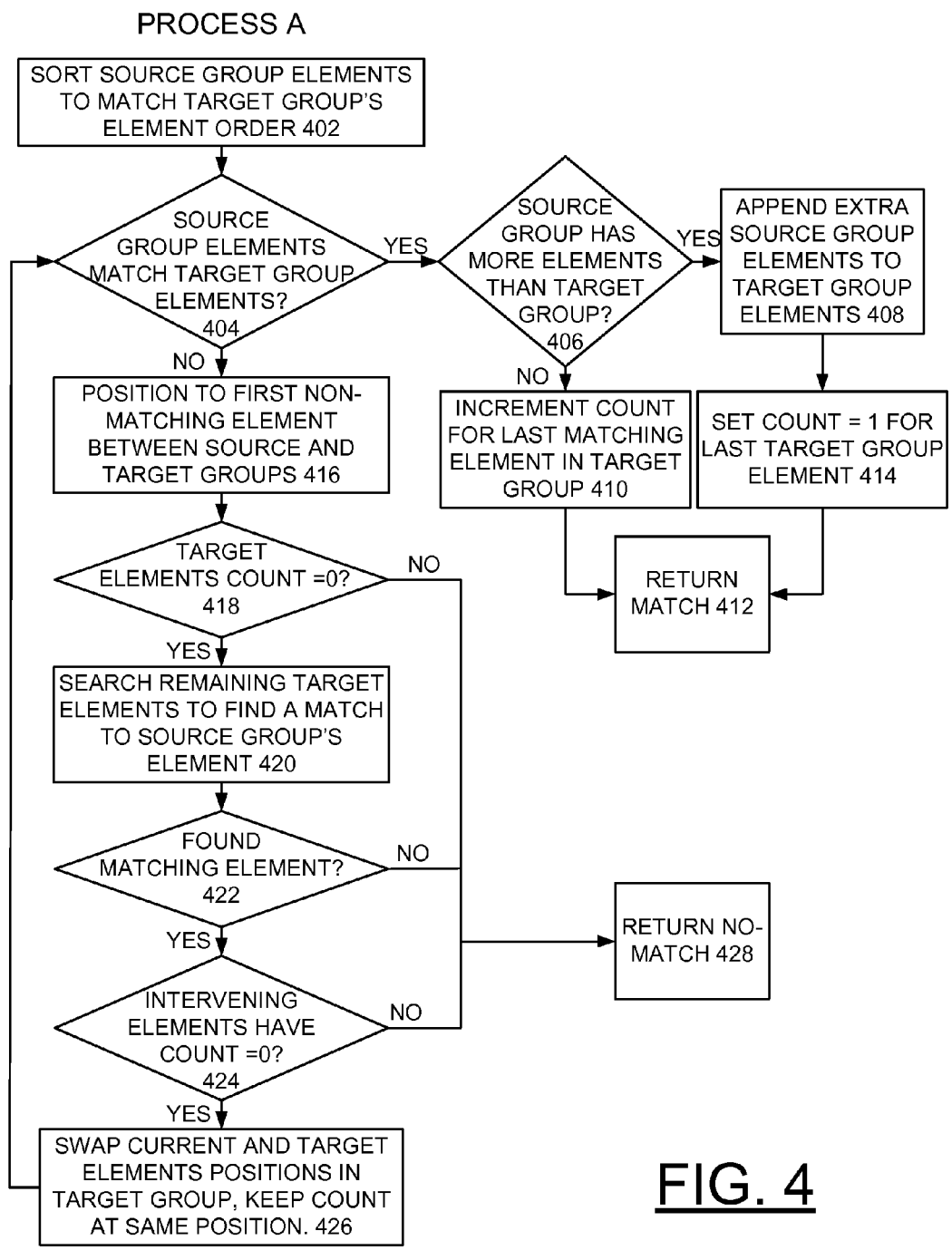

Referring now to FIGS. 3 and 4, there are shown exemplary steps for implementing aggregation combination using aggregate depth lists for optimizing database query processing of the preferred embodiment.

As described in the present application and claims, and as shown in the flow charts of FIGS. 3 and 4, a group includes a collection of elements, and a group corresponds to a grouping set. An element includes a column of a table, and can also include any SQL expression. An element also includes a special value for whole file grouping. A list of group includes a list of zero, and one or more grouping sets. An element count includes an aggregate depth list.

In FIG. 3, the exemplary steps start as indicated at a block 302 with initializing environment, and zeroing out list of target groups. A list of source groups is input as indicated at a block 304. Checking for more source groups is performed as indicated at a decision block 306. When no more source groups are identified, then a target group list is returned as indicated at a block 308.

When more source groups are identified, then a next source group is returned as indicated at a block 310. Each group element is assigned a count of zero, and a last element is assigned a count of 1 as indicated at a block 312. The source group is positioned before start in a target list of groups as indicated at a block 314. Checking for more target groups is performed as indicated at a decision block 316. When more target groups are identified, then the target group is positioned to next group in the target list as indicated at a block 318. Next as indicated at a block 320, a process A is performed as illustrated and described with respect to FIG. 4.

Checking whether the source and target groups match is performed as indicated at a decision block 322. If the source and target groups fail to match, then the operations return to decision block 316 to check for more target groups. When no more target groups are identified at decision block 316, then the source group is added as a new group in the target list. Otherwise, when the source and target groups match, then the operations return to decision block 306 to check for more source groups.

Referring to FIG. 4, the process A starts with sorting the source group elements to match the target group's element order as indicated at a block 402. Checking if the source group elements match the target group elements is performed as indicated at a decision block 404. When the source group elements match the target group elements, checking if the source group has more elements than the target group is performed as indicated at a block 406. When the source group has less than or equal elements to the target group, then the count is incremented for the last matching element in the target group as indicated at a block 410. A match is returned as indicated at a block 412 to continue at decision block 322 in FIG. 3.

When the source group has more elements than the target group, then the extra source group elements are appended to the target group elements as indicated at a block 408. Then the count is set to 1 for the last target group element as indicated at a block 414. Then the match is returned at block 412 to continue at decision block 322 in FIG. 3.

When the source group elements do not match the target group elements at decision block 404, then the target elements are positioned to the first non-matching element between the source and target groups as indicated at a block 416. Checking if the target element count equals zero is performed as indicated at a decision block 418. If the target element count equals zero, then the remaining target element are searched to find a match to the source group's element as indicated at a block 420. Checking for a matching element found is performed as indicated at a decision block 422. When a matching element is found, then checking if the intervening elements have a count equal to zero is performed as indicated at a decision block 424. If the intervening elements have a count equal to zero, then the current and target elements' positions in the target group are swapped, keeping count at the same position as indicated at a block 426. Then the operations continue returning to decision block 404 to check for the source group elements matching the target group elements. As indicated at a block 428, a no-match is returned to continue at decision block 322 in FIG. 3, when the target element count is not zero at decision block 418, matching element is not found at decision block 422, or intervening elements do not have a count of zero at decision block 424.

For example, given the following query:
select country, region, store, product, count(*) from Table group by groupingSets((rollup(country, region, store)), (country, region, store, product), (country))
This query defines 6 grouping pairs (country, region, store), (country, region), (country), ( ), (country, region, store, product), (country).

In this example, the optimizer converts this grouping list into Rollup (country, region, store, product) with a depth list of (1,2,1,1,1). The first depth list entry implies that the whole-file aggregation needs to be performed once. The second entry implies that the grouping set (country) must be preformed twice. The third entry implies that grouping set (country, region) must be performed once, and the like. Using this algorithm for rollup combinations, the optimizer advantageously performs these aggregations in a single pass rather than performing a union of 3 temporary results.

The method of the invention recognizes the natural sets of hierarchies within a cube and converts the cube into those hierarchies. Once converted, the techniques applicable to rollups, for example, as illustrated in FIGS. 3 and 4 are readily brought to bear to reduce the required processing by a considerable amount.

Example

Given Cube (a,b,c)

The cube expands to 8 combinations:
(a,b,c), (a,b), (a), (a,c), (b,c), (b), (c), (–)
However, it contains the 3 natural hierarchies:
rollup(a,b,c) depth list (1,1,1,1), rollup(b,c) depth list (0,1,1), rollup(c,a) depth list (0,1,1)
(rollup' implies that a rollup is generated, but it excludes the whole file summary (–))

This recognition and conversion reduces the aggregate processing from 8 to effectively 3
A cube of 4 (16 combinations) reduces to:
rollup(a,b,c,d) depth list (1,1,1,1,1), rollup(b,c,d) depth list (0,1,1,1), rollup(c,d,a) depth list (0,1,1,1), rollup(d,a,b) depth list (0,1,1,1), (a,c), (b,d) or 6.

In the cited limit above (cube of 6), the processing is reduced from 64 (2**6) to:

rollup(a, b, c, d, e, f) depth list (1, 1, 1, 1, 1, 1, 1), <--7 rollup(b, c, d, e, f) depth list (0, 1, 1, 1, 1, 1)

rollup(c, d, e, f, a) depth list (0, 1, 1, 1, 1, 1), rollup(d, e, f, a, b) depth list (0, 1, 1, 1, 1, 1), rollup(e, f, a, b, c) depth list (0, 1, 1, 1, 1, 1), rollup(f, a, b, c, d) depth list (0, 1, 1, 1, 1, 1), <--25 rollup(a, c, d, e) depth list (0, 0, 1, 1, 1), rollup(b, d, e, f) depth list (0, 0, 1, 1, 1), rollup(c, e, f, a) depth list (0, 0, 1, 1, 1), rollup (d, f, a, b) depth list (0, 0, 1, 1, 1), rollup(e, a, b, c) depth list (0, 0, 1, 1, 1), rollup(f, b, c, d) depth list (0, 0, 1, 1, 1) <--24

(a, d, e), (b, e, f), (c, f, a), (d, a, b), (e, b, c), (f, c, d), (a, c, e), (b, d, f) = 20 <--8

Consequently, the same or higher order of dimensions can be processed with considerably less resources.

Figure 5:
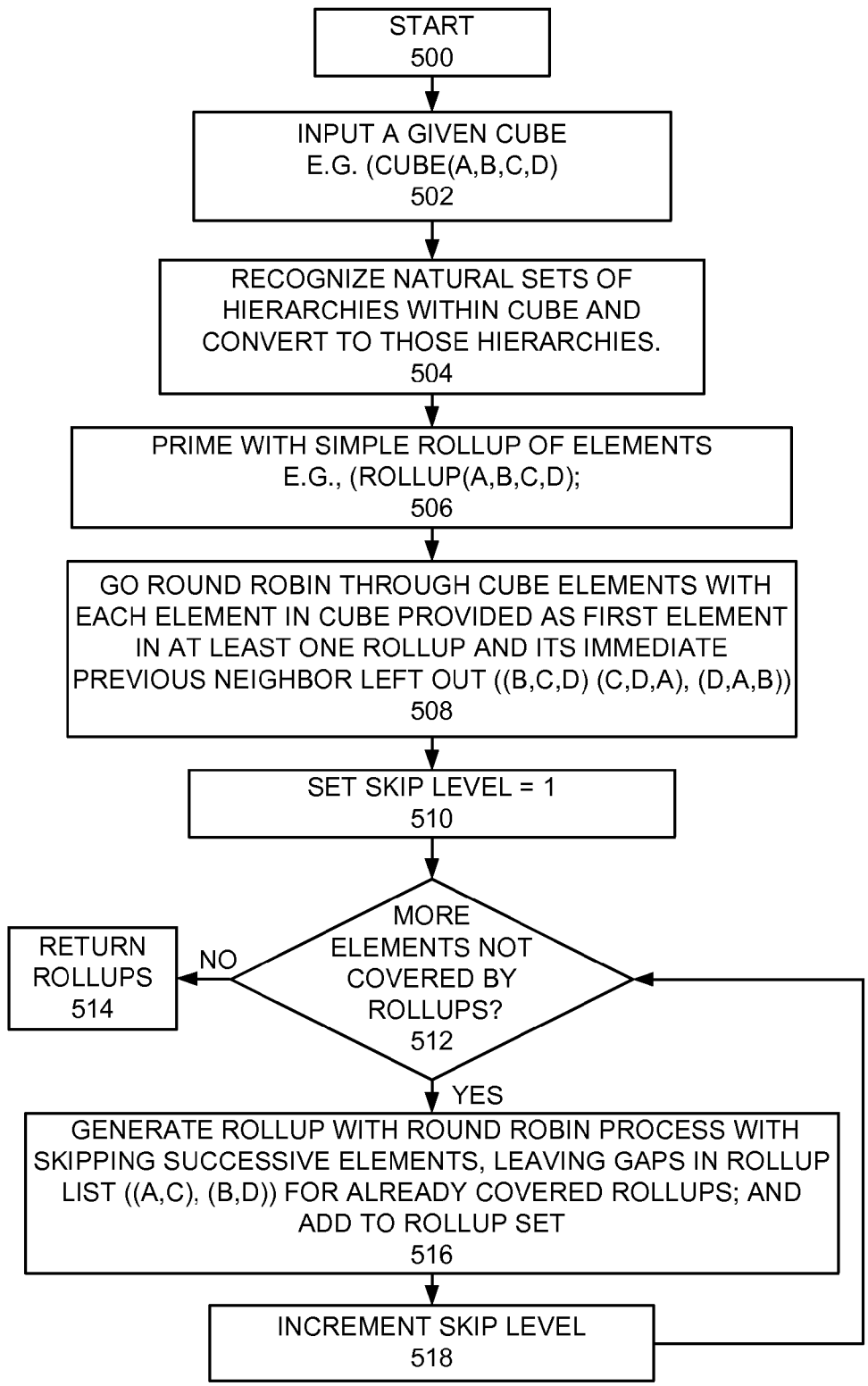

Referring now to FIG. 5, there are shown exemplary steps for cube aggregation conversion to rollup aggregation for optimizing database query processing of the preferred embodiment starting at a block 500. Consider the example used in the process description of FIG. 5 based on cube (a,b,c,d) as indicated at a block 502.

Then as indicated at a block 504, natural sets of hierarchies within the cube are recognized and converted to those hierarchies. The cube aggregation conversion process recognizes that each element (column) in the cube needs to show up as the first element in at least one rollup. Next prime with a simple rollup of the elements, for example, (a,b,c,d) as indicated at a block 506. Then go round robin through the cube elements with each element in the cube provided at the beginning or first element in at least one rollup and its immediate previous neighbor being left out, for example, ((b,c,d), (c,d,a), (d,a,b)) as indicated at a block 508. A skip level is set equal to one as indicated at a block 510. Checking for more elements not covered by rollups is performed as indicated at a decision block 512. When no more elements not covered by rollups are identified, then the rollups are returned as indicated at a block 514. When more elements not covered by rollups are identified, then a rollup is generated by round robin process with skipping successive elements, leaving gaps in rollup list, for example, ((A,C), (B,D)) for already covered rollups; and add to rollup set as indicated at a block 516. Then the skip level is incremented as indicated at a block 518, and the operations continue returning to decision block 512 to check for more elements not covered by rollups.

While the relative gains of the conversion diminish as the number of elements in the cube increases, this process allows the optimizer to handles cubes several degrees higher than would otherwise be possible.

Figure 6:
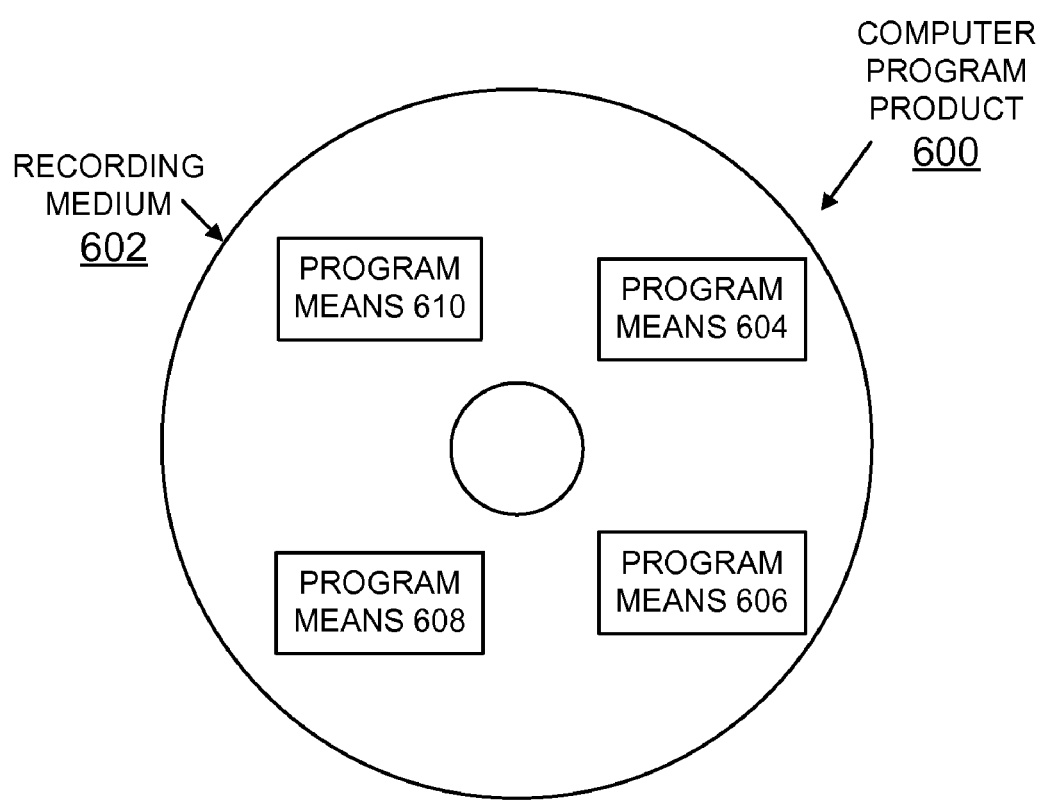
FIG. 6 is a block diagram illustrating a computer program product in accordance with the preferred embodiment.

Referring now to FIG. 6, an article of manufacture or a computer program product 600 of the invention is illustrated. The computer program product 600 includes a recording medium 602, such as, a floppy disk, a high capacity read only memory in the form of an optically read compact disk or CD-ROM, a tape, or another similar computer program product. Recording medium 602 stores program means 604, 606, 608, 610 on the medium 602 for carrying out the methods for implementing aggregation combination using aggregate depth lists and cube aggregation conversion to rollup aggregation for optimizing database query processing of the preferred embodiment in the system 100 of FIG. 1.

A sequence of program instructions or a logical assembly of one or more interrelated modules defined by the recorded program means 604, 606, 608, 610, direct the computer system 100 for implementing aggregation combination using aggregate dept lists and cube aggregation conversion to rollup aggregation for optimizing database query processing of the preferred embodiment.

While the present invention has been described with reference to the details of the embodiments of the invention shown in the drawing, these details are not intended to limit the scope of the invention as claimed in the appended claims.

What is claimed is:

1. A method for implementing aggregation combination using rollup depth lists for optimizing database query processing comprising:

identifying grouping sets and combining multiple grouping sets into multiple single rollups; each grouping set including a collection of elements;

assigning rollup depth lists defining the levels of grouping to be performed for each of said multiple single rollups; each said rollup depth list including respective element counts for each element;

wherein identifying grouping sets and combining multiple grouping sets into multiple single rollups and assigning rollup depth lists includes:

identifying a list of source groups; each source group including a collection of elements;

identifying one source group, reading the source group, initially assigning each source group element a count of zero and assigning a last element a count of one; storing the source group within a target group list;

identifying one target group, processing the stored source group and the identified target group in the target group list, such that the source group elements are sorted to match element order of target group elements; and combining the processed stored source group with the processed identified target group into a single rollup, wherein the element counts of the rollup depth list for said single rollup are determined based on said combining;

generating an access plan utilizing said multiple single rollups; and said corresponding rollup depth lists;

providing an execution engine executing a database query with said access plan; and said execution engine using respective element counts of each rollup depth list to identify how many times to perform each level of aggregation of elements within each of said multiple single rollups, optimizing database query processing.

2. The method for implementing aggregation combination using rollup depth lists for optimizing database query processing as recited in claim 1 further includes identifying the source group has more elements than the target group, and appending extra source group elements to the target group elements, setting count to 1 for last target group element.

3. The method for implementing aggregation combination using rollup depth lists for optimizing database query processing as recited in claim 1 further includes identifying the source group has less or equal elements than the target group, and incrementing count for last target group element.

4. The method for implementing aggregation combination using rollup depth lists for optimizing database query processing as recited in claim 1 includes responsive to not identifying the source group elements matching the target group elements, positioning to first non-matching element between source and target groups.

5. The method for implementing aggregation combination using rollup depth lists for optimizing database query processing as recited in claim 1 wherein said access plan is a multiAggregate AccessPlan and wherein generating an access plan utilizing said multiple single rollups; and said rollup depth lists includes supplying said rollup depth lists as inputs in the creation of said multiAggregate AccessPlan to define what stages of grouping must be performed.

6. The method for implementing aggregation combination using rollup depth lists for optimizing database query processing as recited in claim 1 wherein executing the database query with said access plan includes collating values using a sorted temporary result, an index, a hierarchical hash table, or another collating mechanism to perform multi-stage aggregations.

7. The method for implementing aggregation combination using rollup depth lists for optimizing database query processing as recited in claim 1 further includes implementing cube aggregation conversion to rollup aggregation for optimizing database query processing.

8. The method for implementing aggregation combination using rollup depth lists for optimizing database query processing as recited in claim 7 includes recognizing natural sets of rollup hierarchies within a cube; and converting the cube into the rollup hierarchies.

9. The method for implementing aggregation combination using rollup depth lists for optimizing database query processing as recited in claim 7 includes defining a rollup set starting with a simple rollup of all cube elements.

10. The method for implementing aggregation combination using rollup depth lists for optimizing database query processing as recited in claim 9 further includes defining round robin rollups through cube elements with each cube element at a beginning of a rollup.

11. An apparatus for implementing aggregation combination using rollup depth lists for optimizing database query processing comprising:
   a processor;
   a database management system including a query optimizer; said query optimizer generating an access plan utilizing single rollup sets and rollup depth lists;
   said query optimizer identifying grouping sets and combining multiple grouping sets into multiple single rollups; each grouping set including a collection of elements; and assigning rollup depth lists defining the levels of grouping to be performed for each of said multiple single rollups; each said rollup depth list including respective element counts for each element;
   wherein said query optimizer identifying grouping sets and combining multiple grouping sets into multiple single rollups and assigning rollup depth lists includes:
   said query optimizer identifying a list of source groups; each source group including a collection of elements; identifying one source group, reading the source group, initially assigning each source group element a count of zero and assigning a last element a count of one; storing the source group within a target group list; identifying one target group, processing the stored source group and the identified target group in the target group list; such that the source group elements are sorted to match element order of target group elements; and combining the processed stored source group with the processed identified target group into a single rollup, wherein the element counts of the rollup depth list for said single rollup are determined based on said combining;
   said query optimizer generating an access plan utilizing said multiple single rollups and said corresponding rollup depth lists; and
   a database execution engine executing a database query with said access plan;
   said database execution engine using respective element counts of each rollup depth list to identify how many times to perform each level of aggregation of elements within each of said multiple single rollups, optimizing database query processing.

12. The apparatus for implementing aggregation combination using rollup depth lists for optimizing database query processing as recited in claim 11 includes said query optimizer implementing cube aggregation conversion to rollup aggregation for optimizing database query processing.

13. The apparatus for implementing aggregation combination using rollup depth lists for optimizing database query processing as recited in claim 12 includes said query optimizer recognizing natural sets of rollup hierarchies within a cube; and converting the cube into the rollup hierarchies.

14. A computer-readable storage medium encoded with a computer program product for implementing aggregation combination using rollup depth lists for optimizing database query processing in a computer system, said computer-readable storage medium encoded with said computer program product including instructions executed by the computer system to cause the computer system to perform the steps of:
   identifying grouping sets and combining multiple grouping sets into multiple single rollups; each grouping set including a collection of elements;
   assigning rollup depth lists defining the levels of grouping to be performed for each of said multiple single rollups; each said rollup depth list including respective element counts for each element;
   wherein identifying grouping sets and combining multiple grouping sets into multiple single rollups and assigning rollup depth lists includes:
   identifying a list of source groups; each source group including a collection of elements;
   identifying one source group, reading the source group, initially assigning each source group element a count of zero and assigning a last element a count of one; storing the source group within a target group list;
   identifying one target group, processing the stored source group and the identified target group in the target group list; such that the source group elements are sorted to match element order of target group elements; and combining the processed stored source group with the processed identified target group into a single rollup, wherein the element counts of the rollup depth list for said single rollup are determined based on said combining;

generating an access plan utilizing said multiple single rollups; and said corresponding rollup depth lists;

providing an execution engine executing a database query with said access plan; and said execution engine using respective element counts of each rollup depth list to identify how many times to perform each level of aggregation of elements within each of said multiple single rollups, optimizing database query processing.

15. The computer-readable storage medium encoded with a computer program product for implementing aggregation combination using rollup depth lists for optimizing database query processing as recited in claim 14 further includes implementing cube aggregation conversion to rollup aggregation for optimizing database query processing.

* * * * *